Aug. 27, 1940.　　　　A. EPIFANO　　　　2,212,682
CONVERTIBLE AUTO SEAT
Filed Feb. 28, 1938　　　3 Sheets-Sheet 1

Antonio Epifano,
INVENTOR

Aug. 27, 1940.   A. EPIFANO   2,212,682
CONVERTIBLE AUTO SEAT
Filed Feb. 28, 1939    3 Sheets-Sheet 2

Antonio Epifano, INVENTOR
BY Victor J. Evans & Co.
ATTORNEYS

WITNESS

Aug. 27, 1940.  A. EPIFANO  2,212,682
CONVERTIBLE AUTO SEAT
Filed Feb. 28, 1938  3 Sheets-Sheet 3
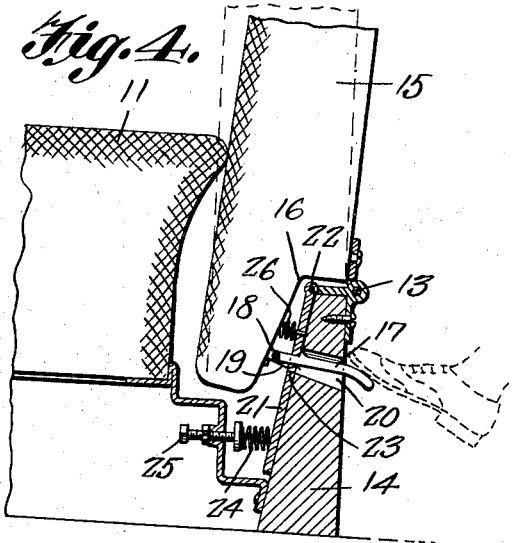
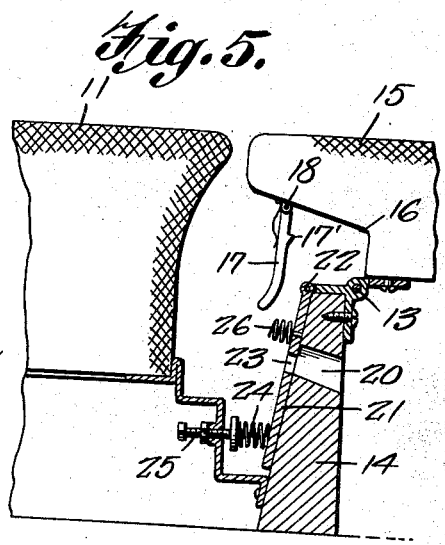
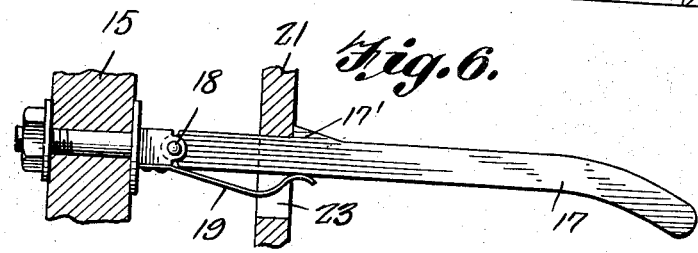
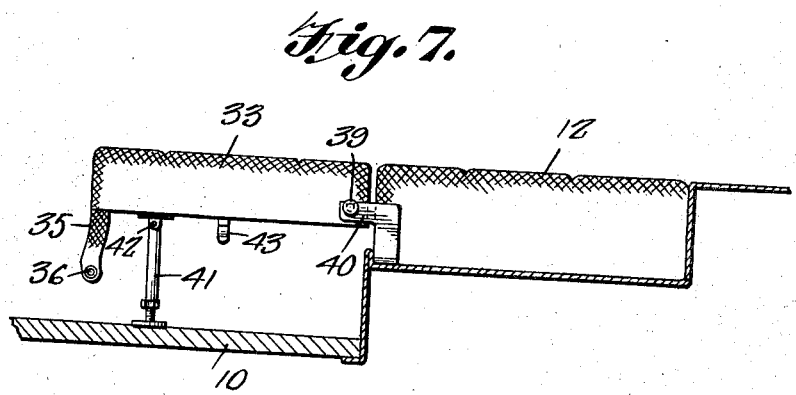
Antonio Epifano, INVENTOR
BY Victor J. Evans & Co.
ATTORNEYS
P. J. Hickey
WITNESS Patented Aug. 27, 1940

2,212,682

UNITED STATES PATENT OFFICE 2,212,682

CONVERTIBLE AUTO SEAT

Antonio Epifano, Wellesley, Mass.

Application February 28, 1938, Serial No. 193,153

3 Claims. (Cl. 155—7)

This invention relates to convertible automobile seats, the principal object being to provide a practical provision for adjustment of the back portions of the front and rear seats of the automobile to afford, in connection with the seat cushions, a convertible bed.

One particular object of the invention is to provide for the selective utilization of the backs to either the front or the rear seat in connection with the two seat cushions in the formation of the bed, as preferred.

A further object is to provide supporting means for the backs of the seats when used in the bed formation and yet be out of the way and arranged so as not to detract from the neat appearance of the backs when used in the regular way.

Still another object is to provide novel means for resiliently supporting the back of the seat in its normal position.

With these and other objects in view the invention consists in the parts and combinations and arrangements of parts hereinafter described and pointed out with particularity in the appended claims.

In the accompanying drawings, illustrating a practical adaptation of the invention:

Figure 4 is a fragmentary view, on an enlarged scale, partly in section and partly in elevation, showing the hinge mounting and latch means for the front seat;

Figure 5 is a view similar to Figure 4 but showing the latch released and the seat back lowered for the bed formation;

Figure 6 is a detailed view of the latch;

Figure 7 is a view illustrating the arrangement of the back of the rear seat arranged in front of the seat cushion to form a bed;

Figure 10 is a view showing a modification of the mounting for the back of the front seat.

Figure 1:
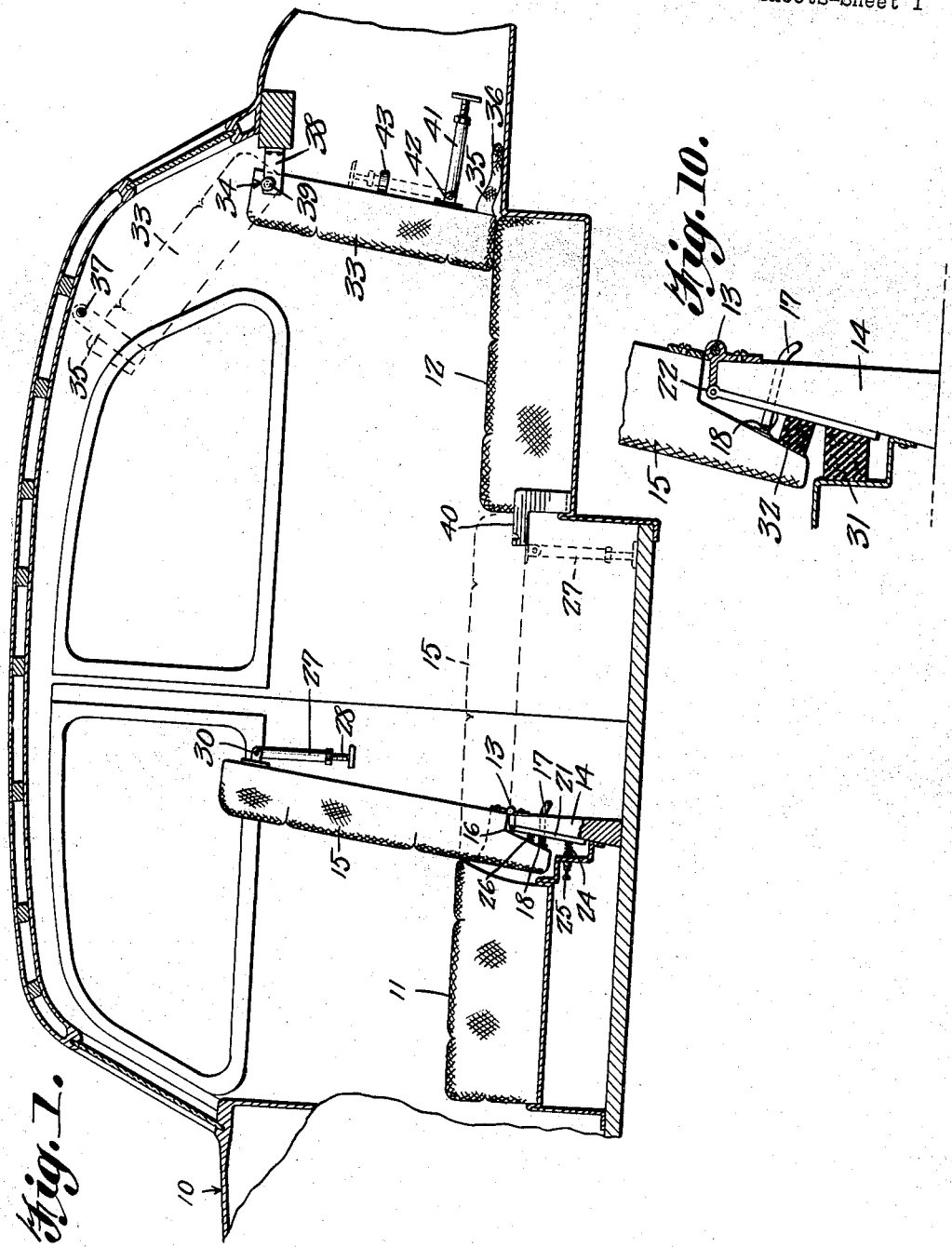
Figure 1 is a longitudinal section of an automobile body showing the front and rear seats in full lines and the ordinary converted positions of the parts in dotted lines.
Figure 2:
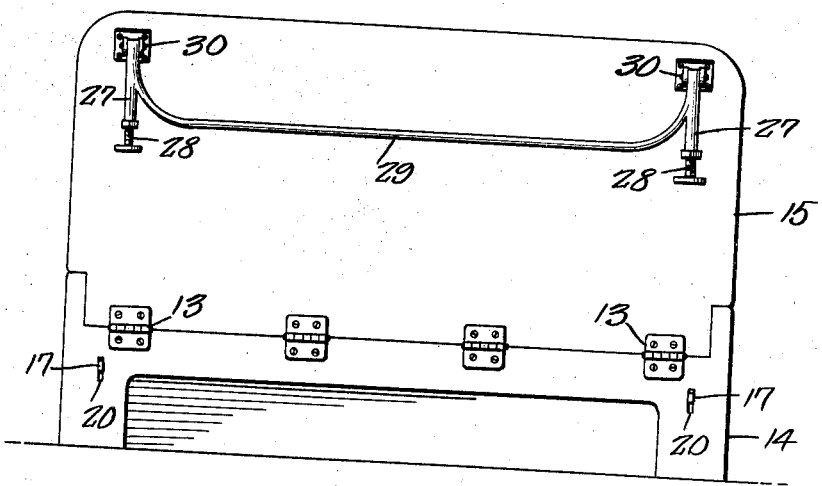
Figure 2 is a rear elevation of the front seat and back in normal position.
Figure 3:
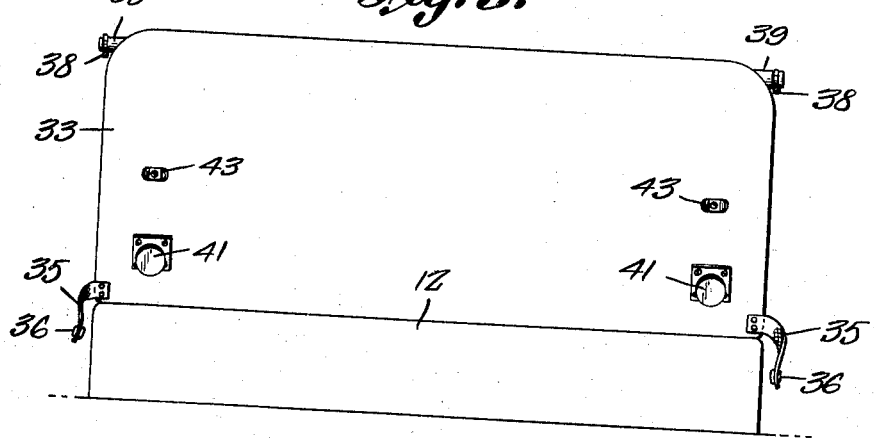
Figure 3 is a similar view of the back seat.

Referring now to the drawings the numeral 10 designates generally the automobile body having the front seat cushion 11 and rear seat cushion 12 mounted in the usual manner therein.

Hingedly mounted as at 13 on a transverse body member 14 at the rear of the front seat 11 is a back cushion 15. The hinged lower portion of the back cushion 15 is recessed, as at 16, and depends in front of the transverse body member 14, said depending portion having a latch member 17 hinged attached thereto, as at 18, said latch member being normally urged and yieldably held by a spring member 19. As shown, the latch member 17 is elongated, and in the raised position of the back cushion 15, is projected through an opening 20 provided therefor in the transverse body member 14, said opening 20 being of ample transverse dimension as to permit the swing of the latch member 17 to permit its release from a latching plate 21 which is hingedly mounted, as at 22, on the upper edge portion of said body member 14.

The latching plate 21 is provided with an opening 23 which registers with the opening 20 of the body member 14 and the latch 17 is provided with a beveled lug 17' which engages the plate 21 at the top of the opening 23 therein when the back cushion 15 is in raised position. As best shown in Figure 4, the plate 21 is yieldably held against the body member 14 by a spring 24, the compression of which is regulated by an adjusting screw 25. By this arrangement the back cushion 15 is permitted limited rearward movement on the hinge 13 against the compressed spring 24 when the latch 17 is engaged with the plate 21, and at the same time limited forward movement of the back cushion 15 is permitted due to the yieldability of a spring 26 interposed between the plate 21 and adjacent lower portion of the cushion 15.

Preferably, there are two of the latch members 17, one being located near each end of the seat, and the projecting ends of the members 17 may be conveniently engaged and depressed by the application of the operator's foot, thus leaving his hands free to grasp the upper portion of the seat back and lower it to the position shown by dotted lines in Figure 1 so that it may cooperate with the front and rear seat cushions 11 and 12 to form the bed.

In the lowered position the seat back 15 is supported on a pair of jack elements 27 having suitable screw extensions 28 for the purpose of leveling the support on the floor of the automobile body. These jacks are preferably made as an integral part of the robe rail or garment hanger, 29, which is hingedly mounted on the rear of the seat back 15, as at 30.

As a modification of the spring members 24 and 26 rubber blocks 31 and 32 may be provided as shown in Figure 10. In other respects the hinge mounting and latch of the back of the front seat is substantially the same as that shown in Figures 1 to 6 inclusive.

Ordinarily, when the back cushion 15 of the front seat 11 is used in forming the bed as shown in Figure 1, the back cushion 33 is raised to the dotted position shown, said cushion being hingedly mounted as at 34, at its upper end, and being provided at its lower end with straps 35 which are provided with suitable snap fasteners 36, or other suitable means, to engage studs 37 provided therefor at the opposite side of the automobile body near the top thereof. By this provision, the back cushion 33 is conveniently supported out of the way and foot room is afforded in the space of the rear trunk compartment of the body.

Figures 8, 9:
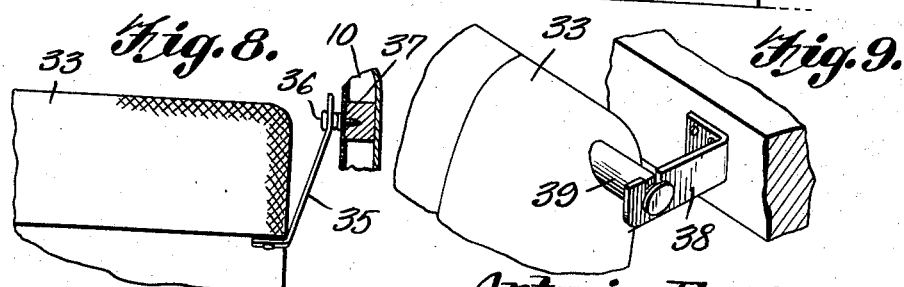
Figure 8 is a fragmentary view, on an enlarged scale, showing means for holding the back of the rear seat in raised position.
Figure 9 is a view showing the separable hinge for the rear seat back section.

In some cases, when it is desirable to provide a bed in the rear of the front seat without disturbing the back 15 of the seat, the back cushion 33 of the rear seat may be utilized in forming the bed, and to accomplish this the hinge 34 is made separable, and for practical purposes the hinge mounting comprises notched brackets 38 to receive trunnions 39, as shown more clearly in Figure 9, said trunnions being transferable from the notched brackets 38 to similar brackets 40 provided on the front portion of the seat 12 (see Figure 7) and in which position the back section 33 is supported by jacks 41 on the floor of the automobile body. Preferably, these jacks 41 are hingedly mounted on the back section 33 as at 42 so as to be folded out of the way and engaged in suitable spring clips 43 provided therefor on the adjacent rear portion of the jack section 33 when the back section is raised to the position shown in Figure 1.

Obviously the structure may be modified in many respects without departing from the spirit and scope of the invention as defined in the appended claims. The invention, therefore, is not limited to the specific construction and arrangement shown in the accompanying drawings.

What is claimed is:

1. In a convertible seat and bed structure for automobiles, a front seat, a back for the front seat hingedly mounted and adapted to be lowered into bed-forming relation to the front seat, and latching means for resiliently and releasably holding the back of the front seat in normal raised position, comprising a plate hingedly mounted on the automobile body, a latch member pivotally mounted on the seat back and releasably engageable with said plate, a spring normally urging the latch member and yieldably holding it in engagement with the plate, a spring element yieldably holding said latch plate in normal position, whereby to afford limited movement of the seat back rearwardly of its hinge axis, and a second spring located between said latch plate and the adjacent portion of the seat back for limiting the movement of the back forwardly of its hinge axis, said limited movements being effected while the releasable latch member is in engaging relation with said plate.

2. In a convertible seat and bed provision for automobiles, a seat structure including a supported seat cushion and a back cushion hingedly supported at its lower end, the lower end portion of the back cushion being recessed inwardly from its rear side, an upright support at the bottom of the vehicle body adjacent the rear side of the seat support, a hinge element connecting the upper portion of said upright support and the adjacent rear portion of the back cushion at the base of the recessed portion of the cushion, the lower front portion of the cushion projecting between said upright support and the adjacent rear portion of the seat cushion, latching means for releasably and resiliently holding said back cushion in a raised normal position, said latching means including a plate hingedly mounted on the front of said upright support and depending normally from its hinge and in contact with the adjacent face of said upright support, said plate having an aperture therein registering with an aperture of larger proportions in said upright support, a latch arm pivotally mounted at its inner end on the adjacent portion of said back cushion which is projected between the upright support and the seat cushion proper, said latch arm being projected through the registered apertures of the hinged plate and the upright support and having a lateral projection to engage the plate adjacent its aperture, a spring element normally urging said latch arm into engagement with said hinged plate, a second spring element interposed between said hinged plate and the support for the seat proper whereby to normally urge said hinged plate into contact with the upright support and to yieldably hold the back cushion in raised position with limited movement of its upper portion rearward of the axis of its hinge with the latch arm engaged with said hinged plate, and a third spring element interposed between said hinged plate and the opposed lower portion of said back cushion whereby said back cushion has limited movement forwardly of the axis of its hinge.

3. A convertible seat arrangement for automobiles, comprising a front seat having a seat portion proper and a back hingedly mounted at its lower end and normally held in a raised position by a releasable latching device located adjacent its hinge with resilient provision cooperative with the hinging means and latching device whereby the back is yieldable with limited cushioned movement both forwardly and rearwardly from its normal position and upon release of the latching device is movable rearwardly to a lowered position to form, in conjunction with the seat portion proper, a bed, the back having a cooperative pair of jack elements hingedly mounted on its upper rear portion and provided with longitudinally adjustable end extensions whereby to adjustably support the back on and with compensation for unevenness of the vehicle floor remotely from its hinged support in its bed-forming position.

ANTONIO EPIFANO.